US008755564B1

(12) United States Patent
Kukshya et al.

(10) Patent No.: US 8,755,564 B1
(45) Date of Patent: Jun. 17, 2014

(54) TECHNIQUE TO INCREASE SPEED OF ASYNCHRONOUS PULSE PROCESSING BASED HYPERSPECTRAL TARGET DETECTION ALGORITHM

(75) Inventors: Vikas Kukshya, Oak Park, CA (US); Roy Matic, Newbury Park, CA (US); Peter Petre, Oak Park, CA (US); David R. Gerwe, West Hills, CA (US)

(73) Assignee: The Boeing Company, Chicago, IL (US)

( * ) Notice: Subject to any disclaimer, the term of this patent is extended or adjusted under 35 U.S.C. 154(b) by 406 days.

(21) Appl. No.: 13/280,025

(22) Filed: Oct. 24, 2011

Related U.S. Application Data

(63) Continuation-in-part of application No. 12/707,672, filed on Feb. 17, 2010, now Pat. No. 8,280,111.

(51) Int. Cl.
*G06K 9/00* (2006.01)
*G06K 9/62* (2006.01)
*G06K 9/40* (2006.01)

(52) U.S. Cl.
USPC .......................................... 382/103; 382/260

(58) Field of Classification Search
CPC .................. G06K 9/0063; G06K 2009/00644; G06K 2009/4657
USPC ......... 382/103–105, 133, 165, 170, 224, 225, 382/226, 227, 260–265
See application file for complete search history.

(56) References Cited

U.S. PATENT DOCUMENTS

| 6,678,395 | B2 * | 1/2004 | Yonover et al. ............... 382/103 |
| 7,515,084 | B1 | 4/2009 | Cruz-Albrecht et al. |
| 7,630,990 | B2 | 12/2009 | Hirata |
| 8,041,121 | B1 * | 10/2011 | Allred .......................... 382/191 |
| 2005/0015418 | A1 | 1/2005 | Chang et al. |
| 2010/0329512 | A1 * | 12/2010 | Nam et al. .................... 382/103 |

OTHER PUBLICATIONS

Andrzej Cichocki and Rolf Unbehauen, "Neural Networks for Solving Systems of Linear Equations—Part II: Minimax and Least Absolute Value Problems", IEEE Transactions on Circuits and Systems, vol. 39, No. 9, Sep. 1992.

Andrzej Cichocki and Rolf Unbehauen, "Neural Networks for Solving Systems of Linear Equations and Related Problems", IEEE Transactions on Circuits and Systems, vol. 39, No. 9, Feb. 1992.

Neural Networks for Optimization and Signal Processing by Andrzej Cichocki and Rolf Unbehauen, John Wiley and Sons, 1993.

Youshen Xia and Jun Wang, "A Recurrent Neural Networks for Solving Nonlinear Convex Programs Subject to Linear Constraints", IEEE Transactions on Neural Networks, vol. 16, No. 2, Mar. 2005.

Youshen Xia, "A New Neural Network for Solving Linear Programming Problems and Its Applications", IEEE Transactions on Neural Networks, vol. 7, No. 2, Mar. 1996.

(Continued)

*Primary Examiner* — Brian Le
(74) *Attorney, Agent, or Firm* — Ameh IP; Lowell Campbell; Elahe Toosi

(57) ABSTRACT

A system, circuit, and methods for increasing speed of an asynchronous pulse processing based hyperspectral target detection algorithm are disclosed. Stored optimized filter coefficients are used to provide initial filter coefficients. The initial filter coefficients are optimized using an asynchronous pulse processor based hyperspectral detection algorithm to provide optimized filter coefficients, and the optimized filter coefficients are stored.

18 Claims, 6 Drawing Sheets

(56) References Cited

OTHER PUBLICATIONS

Chein-I Chang, Jih-Ming Liu, Bin-Chang Chieu, Hsuan Ren, Chuin-Mu Wang, Chien-Shun Lo, Pau-Choo Chung, Ching-Wen Yang, and dye-Jyun Ma, "Generalized Constrained Energy Minimization approach to sub pixel target detection for multispecttral imagery", Optical Engineering, 39 (5), pp. 1275-1281, May 2000.

Smith M. et al: "A new approach to quantifying abundances of materials in multi spectral images", Geoscience and Remote Sensing Symposium, 1994. IGARSS '94. Surface and Atmospheric Remote Sensing: Technologies, Data Analysis and Interpretation, International Pasadena, CA, USA Aug. 8-12, 1994~ New York, NY, USA,IEEE, US, vol. 4, Aug. 8, 1994, pp. 2372-2374, XPOI0138790, 001: DOI:IO.II09/IGARSS.1994.399741 ISBN: 978-0-7803-1497-9; p. 2372.

Farrand, W.: "Mapping the distribution of mine tailings in the Coeur d'Alene River Valley, Idaho, through the use of a constrained energy minimization technique", Remote Sensing of Environment, vo 1. 59, No. 1, Jan. 1, 1997, XP55002809, ISSN: 0034-4257, 001: 10.1016/S0034-4257(96)00080-6; pp. 64-76, Section: "Constrained energy minimization".

Boyd S et al: "Convex Optimization", Jan. 1, 2004, Cambridge, XP002650252, ISBN: 978-0-521-83378-3; pp. 291-305; Chapter 6.

Dimitris Manolakis, D.: "Taxonomy of detection algorithms for hyperspectral imaging applications", Optical Engineering, vol. 44, No. 6, Jan. 1, 2005, XP55002214, ISSN: 0091-3286, 001: 10.1117/1.1930927; p. 066403, whole document.

Chang C-I: "Orthogonal Subspace Projection (OSP) Revisited: A Comprehensive Study and Analysis", IEEE Transactions on Geoscience and Remote Sensing, IEEE Service Center, Piscataway, NJ, US, vol. 43, No. 3, Mar. 1, 2005, XP011127141, ISSN: 0196-2892, 001: OOI:I0.1109/TGRS.2004.839543; pp. 502-518, Section IV, IVA.

Weimin Liu et al: "A nested spatial window-based approach to target detection for hyperspectral imagery", Geoscience and Remote Sensing Symposium, 2004. IGARSS '04. Proceedings 2004 IEEE International Anchorage, AK, USA Sep. 20-24, 2004, Piscataway, NJ, USA,IEEE, vol. 1, Sep. 20, 2004, XPOI0751163, 001: DOI:I0.1109/IGARSS.2004.1369012 ISBN: 978-0-7803-8742-3; pp. 266-268, whole document.

Tian Han et al: "Hyperspectral endmember detection and unmixing based on linear programming", Learning From Earth's Shapes and Sizes IGARSS 2003, 2003 IEEE International Geoscience and Remote Symposium , Centre De Congres Pierre Saudis, Toulouse, France, Jul. 21-25, 2003 , Proceedings; IEEE International Geoscience and Remote Sensing Sym, vol. 3, Jul. 21, 2003, XP010703927, 001: DOI:I0.1109/IGARSS.2003.1294243 ISBN: 978-0-7803-7929-9; pp. 1763-1766.

Bajjouk: "Quantification of subpixel cover fractions using principal component analysis and a linear programming method: application to the coastal zone of Roscoff (France)", Remote Sensing of Environment, vo. 1, 64, No. 2, Jan. 1, 1998, XP55002228, ISSN: 0034-4257; p. 153, Section: "Methodology of Determination of Cover Type Proportions".

Hord: "Linear programming approach to unmixing hyperspectral image pixels [3240-10J", Proceedings of SPIE, Jan. 1, 1998, XP55002232, ISSN: 0277-786X; p. 69, whole document.

A. Schaum, "Autonomous Hyperspectral Target Detection with Quasi-Stationarity Violation at Background Boundaries", I.E.E.E. 35th Applied Imagery and Pattern Recognition Workshop, 2006.

Qian Du et al., "A Signal-Decomposed and Interference-Annihilated Approach to Hyperspectral Target Detection" Geoscience and Remote Sensing, IEEE Transactions on vol. 42, Issue: 4 Digital Object Identifier: 10.1109/TGRS.2003.821887 Publication Year: 2004, pp. 892-906.

Chang, "Target Signature-Constrained Mixed Pixel Classification for Hyperspectral Imagery" Geoscience and Remote Sensing, IEEE Transactions on vol. 40, Issue: 5 Digital Object Identifier: 10.1109/TGRS.2002.1010894 Publication Year: 2002, pp. 1065-1081.

Chein-I Chang, "Kalman Filtering Approach to Multispectral/Hyperspectral Image Classification" I.E.E.E. Transactions on Aerospace and Electronic Systems vol. 35 No. 1 Jan. 1999, pp. 319-330.

\* cited by examiner

US 8,755,564 B1

TECHNIQUE TO INCREASE SPEED OF ASYNCHRONOUS PULSE PROCESSING BASED HYPERSPECTRAL TARGET DETECTION ALGORITHM

CROSS-REFERENCE TO RELATED APPLICATION

This application claims priority under U.S.C. 120 to and is a Continuation-In-Part application of U.S. patent application Ser. No. 12/707,672, filed 17 Feb. 2010 now U.S. Pat. No. 8,280,111, content of which is incorporated herein by reference in its entirety.

BACKGROUND

Embodiments of the present disclosure relate generally to hyper-spectral imaging and detection, and more particularly relate to hyper-spectral target detection. Hyper-spectral imaging and detection is a type of spectral imaging and analysis that generally utilizes a wide not-necessarily contiguous band of electromagnetic spectrum for imaging and/or detection of objects. Hyper-spectral remote sensing is used in a wide array of applications, for example, mining and geology where it can be used to look for oil and minerals. Hyper-spectral imaging is also used in fields as widespread as ecology and surveillance, airport security, as well as historical manuscript research such as for imaging ancient illegible texts. There are also automotive applications such as for collision avoidance. Hyper-spectral imaging technology is also relevant to various target detection applications, such as intelligence, surveillance, and reconnaissance (ISR) applications using unmanned aerial vehicles (UAVs).

A hyper-spectral imaging and detection system receives hyper-spectral image data from one or more sensors. The hyper-spectral image data generally contains hundreds to thousands of spectrum bands. Hyper-spectral sensors generally collect information as a set of images, where each image is a two-dimensional array of pixels. Each pixel measures and represents received energy in a range of the electromagnetic spectrum (spectral band). These images are then combined as planes to form a three-dimensional hyper-spectral cube where depth represents a pixel array plane for each spectral band.

Precision of the one or more sensors is typically measured in spectral resolution, where spectral resolution is a bandwidth of each band of the spectrum that is captured by the one or more sensors. If the hyper-spectral imaging and detection system receives a large number of fairly narrow frequency bands, it is possible to identify objects even if the objects are captured in a handful of pixels. However, spatial resolution is a factor in addition to spectral resolution. If a pixel receives spectra from too large a surface area, then multiple objects can be captured in the same pixel, which could make identifying a target more difficult. If the pixels are too small, then the energy captured by each sensor-cell is low, and the decreased signal-to-noise ratio reduces the reliability of measured features.

Various algorithms exist to identify target material from background and/or unknown material within a pixel. Generally, the algorithms require high speed, high dynamic-range analog to digital conversion (digitization) of analog signals upfront, followed by highly complex and computationally-intensive digital signal processing (DSP). Both digitization and DSP operations can be very power consuming. Existing algorithm implementations in hardware, such as conventional analog signal processing, may not be optimal due to performance limitations of, for example, the analog circuits using scaled Complementary Metal-Oxide Semiconductor (CMOS) technologies. Conversely, traditional DSP approaches require high-speed sampling and a priori digitization, that may be limited by high power consumption and resulting low computational speed. Traditional hyper-spectral target detection algorithms, such as existing constrained energy minimization (CEM) algorithm implementations, may not be capable of real-time or near real-time performance, especially onboard small power-restricted mobile platforms.

SUMMARY

A system, circuit, and methods for increasing speed of an asynchronous pulse processing based hyperspectral target detection algorithm are disclosed. Stored optimized filter coefficients are used to provide initial filter coefficients. The initial filter coefficients are optimized using an asynchronous pulse processor based hyperspectral detection algorithm to provide optimized filter coefficients, and the optimized filter coefficients are stored.

In this manner, a simple, high resolution, yet low-power implementation algorithms for a real-time or near real-time hyper-spectral imaging and target detection technique is provided using a continuous-time, discrete-amplitude, analog and digital signal-processing circuit and methods to increase speed of an asynchronous pulse processing based hyperspectral target detection algorithm.

In an embodiment, a method of increasing speed of an asynchronous pulse processing based hyperspectral target detection algorithm uses stored optimized filter coefficients to provide initial filter coefficients. The method further optimizes initial filter coefficients using an asynchronous pulse processor based hyperspectral detection algorithm to provide optimized filter coefficients, and stores the optimized filter coefficients.

In another embodiment, a system for increasing speed of an asynchronous pulse processing based hyperspectral target detection algorithm comprises an asynchronous pulse processor. The asynchronous pulse processor is operable to set initial filter coefficients to stored optimized filter coefficients, and optimize the initial filter coefficients using a hyperspectral detection algorithm to provide optimized filter coefficients. The asynchronous pulse processor is operable to store the optimized filter coefficients.

In a further embodiment, a circuit for asynchronous pulse processing based hyper-spectral target detection comprises an initialization module, a pixel-filter coefficient matrix product module, and a filter coefficient calculation module. The initialization module is operable to set an instantaneous CEM filter coefficients vector to comprise a plurality of stored optimized filter coefficients. The pixel-filter coefficient matrix product module is operable to calculate a CEM value vector based on the instantaneous CEM filter coefficients vector. The filter coefficient calculation module is operable to provide the instantaneous CEM filter coefficients based on the CEM value vector, and store the optimized filter coefficients.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. As used herein, the term operable means "able to operate", and includes the capability of being put into use, operation, or practice

BRIEF DESCRIPTION OF DRAWINGS

Embodiments of the present disclosure are hereinafter described in conjunction with the following figures, wherein like numerals denote like elements. The figures are provided for illustration and depict exemplary embodiments of the disclosure. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to hyper-spectral sensing, DSP, CEM, circuits, and other functional aspects of the systems (and the individual operating components of the systems) may not be described in detail herein. In addition, those skilled in the art will appreciate that embodiments of the present disclosure may be practiced in conjunction with remote sensing, target detection, and the like. Those skilled in the art will also appreciate that the system described herein is merely one example embodiment of the disclosure.

Embodiments of the disclosure are described herein in the context of a practical non-limiting application, namely, remote sensing. Embodiments of the disclosure, however, are not limited to such remote sensing applications, and the techniques described herein may also be utilized in other applications. For example, embodiments may be applicable to image analysis, collision avoidance, human body scanning for drugs and explosives at airports, luggage scanning, product defect scanning, and the like.

As would be apparent to one of ordinary skill in the art after reading this description, the following are examples and embodiments of the disclosure are not limited to operating in accordance with these examples. Other embodiments may be utilized and structural changes may be made without departing from the scope of the exemplary embodiments of the present disclosure.

Figure 1:
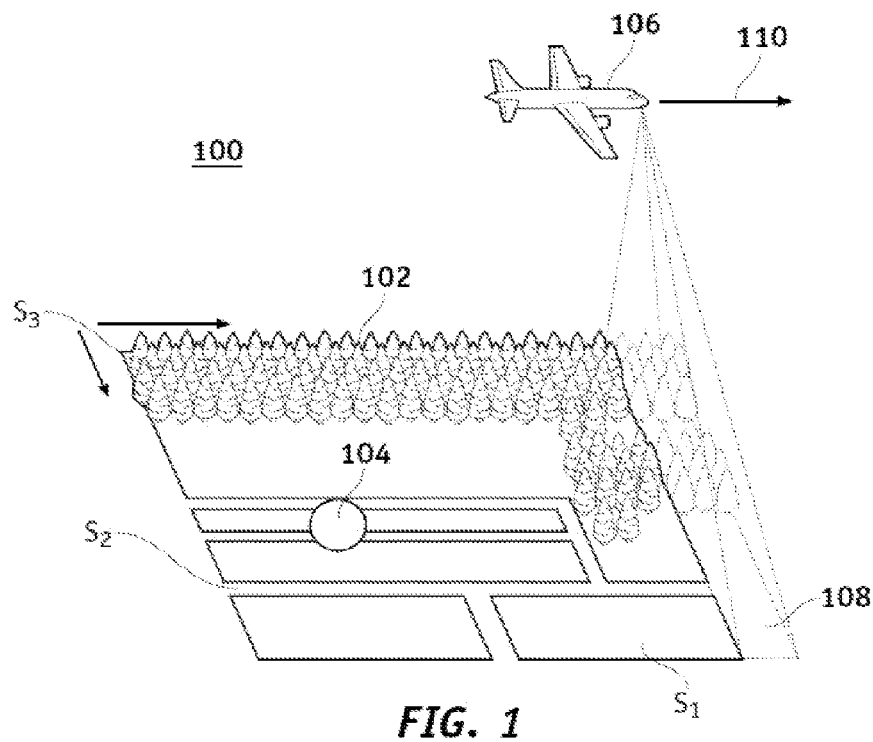
FIG. 1 is an illustration of an exemplary hyper-spectral imaging scenario according to an embodiment of the disclosure.

FIG. 1 is an illustration of a hyper-spectral imaging scenario 100 according to an embodiment of the disclosure. The hyper-spectral imaging scenario 100 comprises a scanned surface 102, a target 104, and an imaging platform 106. The imaging platform 106 such as an aircraft scans the scanned surface 102 to search for the target 104.

The scanned surface 102 comprises, for example but without limitation, a land surface comprising three different types of terrain materials $S_1$ such as plowed fields, $S_2$ such as roads, and $S_3$ such as trees. The plowed fields $S_1$, the roads $S_2$, and the trees $S_3$, each may have different spectral characteristics in hyper-spectral frequency bands. For example, the plowed fields $S_1$ may have high absorption at water absorption frequencies, the roads $S_2$ may have high abortion at tar and asphalt absorption frequencies, and the trees $S_3$ may have high absorption of visible light.

The target 104 may comprise, for example but without limitation, a metal object such a rifle. The rifle may be held by a soldier and hidden in foliage. Because the rifle is hidden in foliage, the rifle may be difficult to distinguish from a background such as the scanned surface 102 by visible imaging alone. However, the target 104, such as the rifle in this example, may have hyper-spectral spectra that are distinguishable from hyper-spectral spectra of the scanned surface 102.

The imaging platform 106 may comprise, for example but without limitation, a surveillance aircraft, a satellite, a balloon, an unmanned aerial vehicle (UAV), a ground vehicle, a boat or ship, mobile platform such as a hand held device, full body scanners at borders and ports, or other imaging platform. The imaging platform 106 comprises a hyper-spectral imaging device (not shown). The imaging platform 106 such as an aircraft can fly over the scanned surface 102 to search for the target 104 using the hyper-spectral imaging device. As the imaging platform 106 flies over the scanned surface 102, it scans a scanned strip 108 of the scanned surface 102. For example but without limitation, the scanned strip 108 may be about 1,000 meters in length substantially perpendicular to a direction of flight 110 and about 100 meters in width substantially parallel to the direction of flight 110. Depending on a speed and configuration of the imaging platform 106, the imaging platform 106 may scan the scanned strip 108 and subsequent strips, for example but without limitation, about 60 times a second (60 Hz), or other frequency. Strips such as the scanned strip 108 may or may not be consecutive in the direction of flight 110. So, the scanned strip 108 may be scanned non-contiguously.

Figure 2:
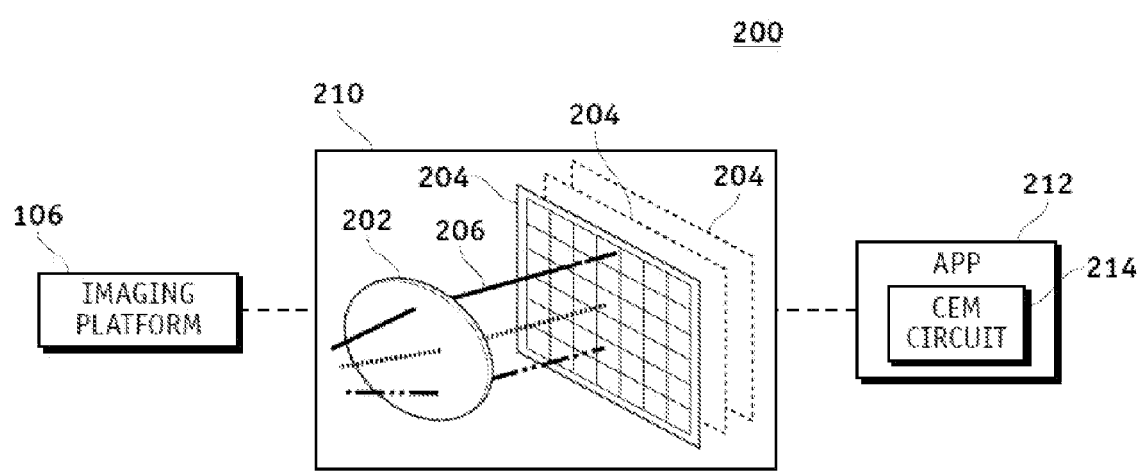
FIG. 2 is an illustration of an exemplary hyper-spectral imaging system according to an embodiment of the disclosure.

FIG. 2 is an illustration of an exemplary hyper-spectral imaging system 200 according to an embodiment of the disclosure. The exemplary hyper-spectral imaging system 200 comprises a sensor 210, and an Asynchronous Pulse Processor (APP) 212 comprising a CEM circuit 214. The sensor 210 may be coupled to the imaging platform 106 and comprises a lens system 202, and a focal plane array 204. The sensor 210 may be, for example but without limitation, a push-broom sensor, and the like.

The lens system 202 focuses a light stream 206 received from the scanned surface 102 (FIG. 1) onto the focal plane array 204 of the sensor 210, and divides the light stream 206 into a plurality of spectra. For example but without limitation, the lens system 202 may divide the light stream 206 into 210 imaged spectral bands, or other number of spectral bands.

The focal plane array 204 comprises an array of pixels and each pixel comprises sub-pixels for receiving the image spectral bands. For example but without limitation, the focal plane array 204 may comprise an array of pixels comprising nine spatial pixels each comprising sub-pixels for receiving the 210 imaged spectral bands. The 210 imaged spectral bands may partition a frequency spectrum from, for example but without limitation, about 500 nm to about 1100 nm, or other frequency spectrum range. The nine spatial pixels image the scanned surface 102 as a line substantially perpendicular to a scanning direction as the imaging platform 106 scans over the scanned surface 102. In this manner, the focal plane array 204 yields a real valued matrix X of 9 pixel data vectors $x_i$ (i=1-9), where each of the pixel data vectors $x_i$ comprises 210 data values for each of the 210 imaged spectral bands ($\lambda_1, \ldots, \lambda_{210}$) for each time period. Hereinafter, each of the pixel data vectors $x_i$ (i=1-9) may be referred to as pixel spectra, hyperspectra image data, or spectra of $i^{th}$ pixel interchangeably.

The APP 212 may be coupled to the sensor 210. The APP 212 may be a special purpose processor that can process linear programming optimization algorithms in real-time or near real-time. A linear programming optimization optimizes a utility function over a convex polytope. In this manner, a modified CEM algorithm can be mapped onto the CEM circuit 214 of the APP 212 for detection of the target 104 as explained in more detail below. The APP 212 is a continuous-time discrete-amplitude signal processor that can enable simple, high resolution, low power implementation of advanced algorithms such as a CEM algorithm modified as a standard linear programming optimization problem. The CEM circuit 214 of the APP 212 receives real-time or near real-time hyper-spectral image data comprising the array of pixels from the focal plane arrays 204 of the sensor 210. The array of pixels generate pixel data vectors $x_i$ (i=1-9) comprising hyper-spectral image data. Output of the CEM circuit 214 of the APP 212 comprises, for example but without limitation, spectra t of target material of the target 104, relative abundance values $y_i$ (equation (2) below) of the target 104 in each of the pixels, or other output of the CEM circuit 214. Processors other than an Asynchronous Pulse Processor (APP 212) may also be used, such as but without limitation, a microprocessor, a digital signal processor, an analog signal processor, a mixed analog/digital processor, or other processor.

Figure 3:
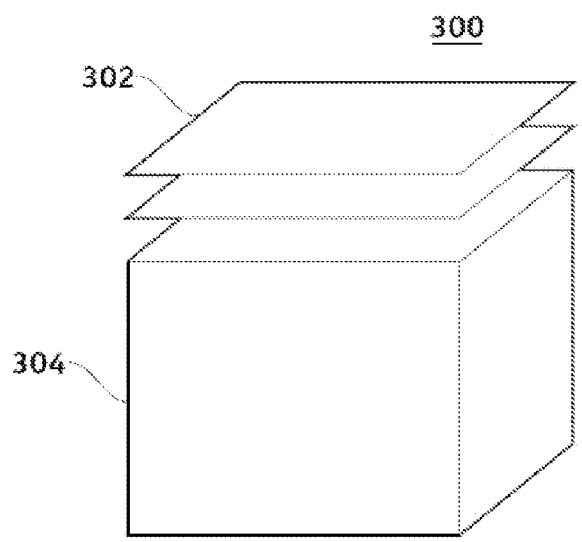
FIG. 3 is an illustration of an exemplary hyper-spectral image data cube according to an embodiment of the disclosure.

FIG. 3 is an illustration of an exemplary hyper-spectral image data cube 300 according to an embodiment of the disclosure. The hyper-spectral image data cube 300 comprises a plurality of hyper-spectral planes 302 that form a hyper-spectral image data cube 304. The hyper-spectral planes 302 are formed by the real valued matrix X, which comprises data from the scanned strip 108 (FIG. 1). The hyper-spectral image data cube 304 comprises data from a plurality of scanned strips such as the scanned strip 108 collected across the scanned surface 102.

In order to identify pixels comprising target material such as the target 104, a modified CEM algorithm is executed. The modified CEM algorithm creates a statistical description of background spectra from a given scene and then weights a comparison of the background spectra to target spectra in such a way so as to minimize effects of the background spectra that might be mixed into the hyper-spectra image data $x_i$ of a given scene. In this manner, the modified CEM algorithm finds pixels that comprise a specified target material and estimates an amount of the specified target material spectra in spectra of the pixels. As a first step, the modified CEM algorithm finds CEM filter coefficients w by optimizing the following relationship:

$$\min(w^T \bar{x}), \bar{x} = \frac{1}{p}\sum_{i=0}^{p} x_i \quad (1)$$

and $$\begin{cases} w^T * t = 1 \\ w^T * x_i \geq 0 \quad i=1, \ldots, p \end{cases}$$

where p is total number of pixels in a group under consideration; $x_i$ is a vector (size nb×1) comprising spectra of the $i^{th}$ pixel; nb is a number of imaged spectral bands $\lambda_i$ per each of the p pixels; $\bar{x}$ is a vector (size nb×1) comprising an averaged spectra (estimated background spectra) of the p pixels (or non-excluded pixels); t is a vector (size nb×1) comprising spectra (target spectra) of the target material; w is a CEM filter coefficients vector (size 1×nb), and T represents a vector transpose operation.

As a second step, the modified CEM algorithm filters the p pixels according to the following relationship:

$$y_i = \bar{w}^T \bar{x}_i, i=1 \ldots, p \quad (2)$$

where $y_i$ is a relative abundance of the target material in each of the p pixels, $\bar{w}$ is CEM filter coefficients vector (size nb×1), $\bar{x}_i$ is a vector (size nb×1) comprising a background estimate (radiance) of the $i^{th}$ pixel. For example, if $y_i$ is equal to 1, then the $i^{th}$ pixel comprises about 100% of the target material, if $y_i$ is equal to 0, then the $i^{th}$ pixel comprises about 0% of the target material, and if $y_i$ is equal to Z, then the $i^{th}$ pixel comprises about 100*Z% of the target material.

For a given segment of the hyper-spectral image data $x_i$ of a total of p pixels, the estimated background spectra $\bar{x}$ is calculated by averaging the hyper-spectral image data $x_i$ of the pixels. The modified CEM algorithm then estimates the CEM filter coefficients w for a given segment of the hyper-spectral image data $x_i$ by minimizing a cost function, which is a product of the estimated background spectra $\bar{x}$ and the CEM filter coefficients vector w (CEM filter coefficients w). Two constraints that equation (1) should satisfy during the minimization process are: (1) a product of the target spectra t of the target material and the CEM filter coefficients w should be unity ($w^T*t=1$), and (2) individual products of each of the p pixels and the CEM filter coefficients w should be greater than or equal to zero ($w^T*x_i \geq 0$).

Alternatively, in some embodiments, the individual products for constraint (2) ($w^T*x_i \geq 0$) for at least one pixel data vector $x_i$ and the CEM filter coefficients w may be allowed to be less than zero due to, for example but without limitation, calibration errors, noise, and the like. For example, if the modified CEM is used to detect gases (e.g., an environment protection application), $w^T*x_i$ can be negative when the gases appear to be in absorption mode (i.e., gas cooler than the background) versus emission mode (i.e., gas warmer than the background). When a target is in absorption mode, the target can be negatively correlated with a CEM filter.

The hyper-spectral image data cube 300 is an example to which the modified CEM algorithm can be applied to detect a target 104. In this example, one target material such as the target 104 and three unknown materials such as the terrain materials $S_1$, $S_2$, $S_3$ shown in FIG. 1 are present in the scene such as the scanned surface 102 shown in FIG. 1. Each pixel datum of the real valued matrix X (9 rows and 210 columns) may comprise a weighted sum of spectra of the four materials $S_1$, $S_2$, $S_3$, and the target material. Spectra of the three unknown materials such as the terrain materials $S_1$, $S_2$, $S_3$ shown in FIG. 1 may be unknown. In practice, random noise may mask the spectra of the four materials $S_1$, $S_2$, $S_3$, and the target material. In this example, a random noise is added to the 210 imaged spectral bands $(\lambda_1, \ldots, \lambda_{210})$ of the p=9 pixels resulting in a signal to noise ratio (SNR) of about 90 dB.

In order to improve accuracy, the estimated background spectra $\bar{x}$ may be calculated by excluding pixels determined to be target pixels. Pixels that are not excluded from a calculation of the estimated background spectra $\bar{x}$ are non-excluded pixels. The estimated background spectra $\bar{x}$ may be calculated based on the following relationship:

$$\bar{x} = \frac{1}{p}\sum_{i=0}^{p} x_i$$

where p is a total number of non-excluded pixels, $x_i$ is a vector comprising spectra of an $i^{th}$ non-excluded pixel, and $\bar{x}$ is a vector comprising an averaged spectra of the non-excluded pixels.

Figure 4:
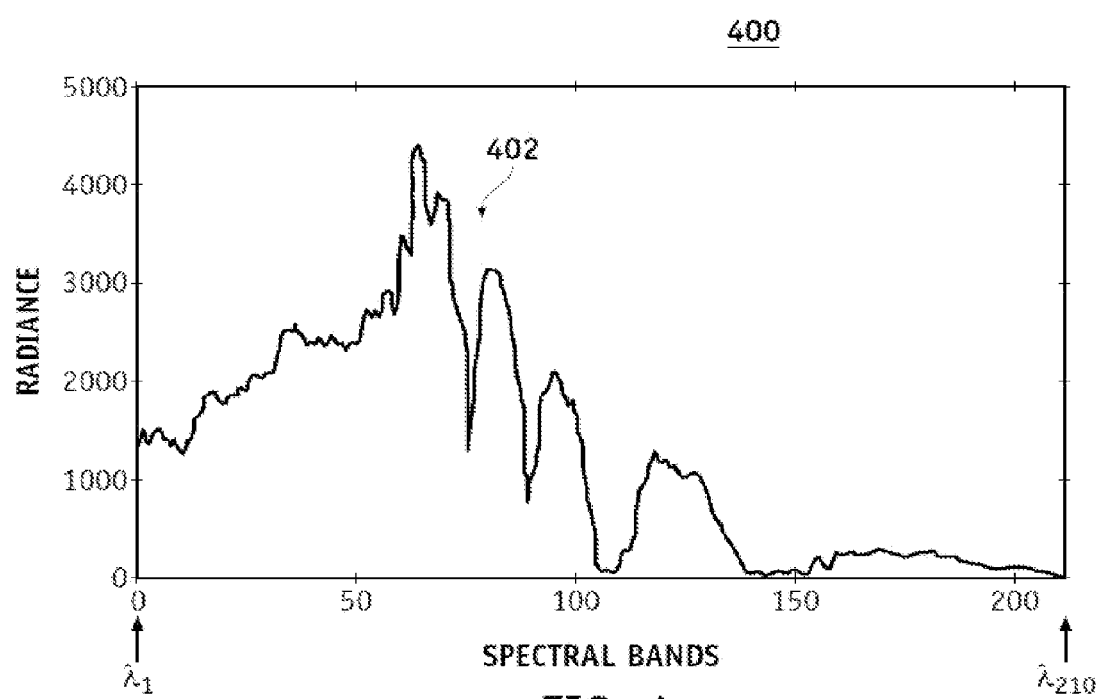
FIG. 4 is an illustration of exemplary hyper-spectral target spectra according to an embodiment of the disclosure.

FIG. 4 is an illustration of exemplary hyper-spectral target spectra 400 according to an embodiment of the disclosure. The hyper-spectral target spectra 400 corresponds to the target material and comprises radiance values 402 for each of the 210 imaged spectral bands $(\lambda_1, \ldots, \lambda_{210})$. The radiance values 402 represent received electromagnetic radiation, and may be derived from, for example but without limitation, direct empirical measurement, indirect empirical measurement, notional design, or other radiance values derivation method. The hyper-spectral target spectra 400 are compared to the real valued matrix X for each scanned strip 108. The comparison may be through correlation, or other signal processing technique, and the degree of correlation indicates a likelihood of presence of the target material in the pixel data vector $x_i$ of each of the p pixels.

Figure 5:
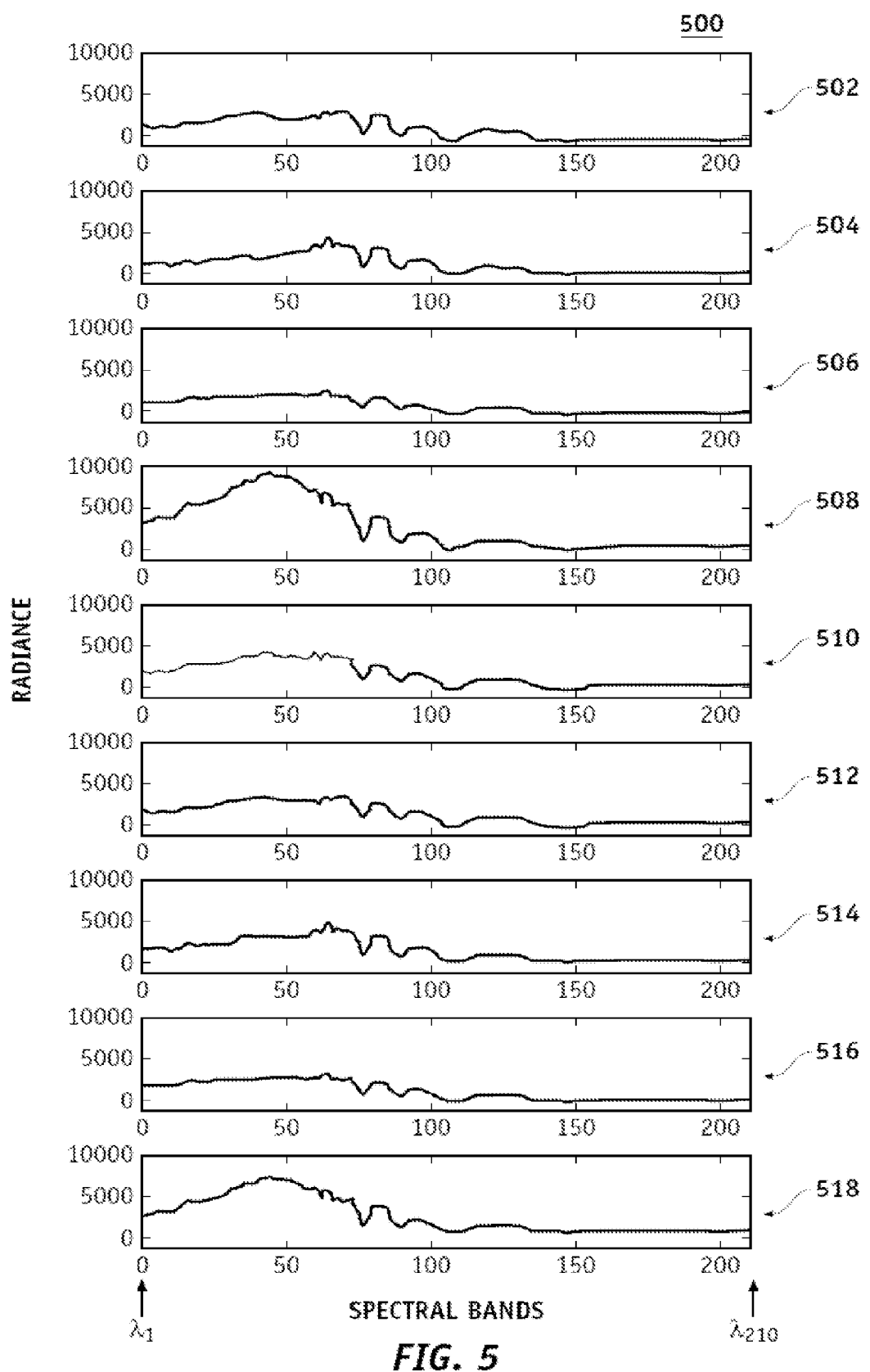
FIG. 5 is an illustration of exemplary hyper-spectral image data for each pixel of a real valued matrix according to an embodiment of the disclosure.

FIG. 5 is an illustration of exemplary hyper-spectral image data 500 showing graphs of hyper-spectral image data 502-518 for each of the p=nine pixels each having a pixel spectra $x_i$ of the real valued matrix X respectively according to an embodiment of the disclosure. Each graph of the hyper-spectral image data 502-518 corresponds to each of the nine pixel data vectors $(x_1, x_2, \ldots, x_9)$. Each of the p=nine pixels comprises scanned radiance measurements for each of the 210 imaged spectral bands $(\lambda_1, \ldots, \lambda_{210})$ from the scanned strip 108. The hyper-spectral target spectra 400 (FIG. 4) is compared to the hyper-spectral image data 500 to determine presence or absence of the target material in the pixel data vector $x_i$ of each of the p pixels and thereby determine the presence or absence of the target 104.

Figure 6:
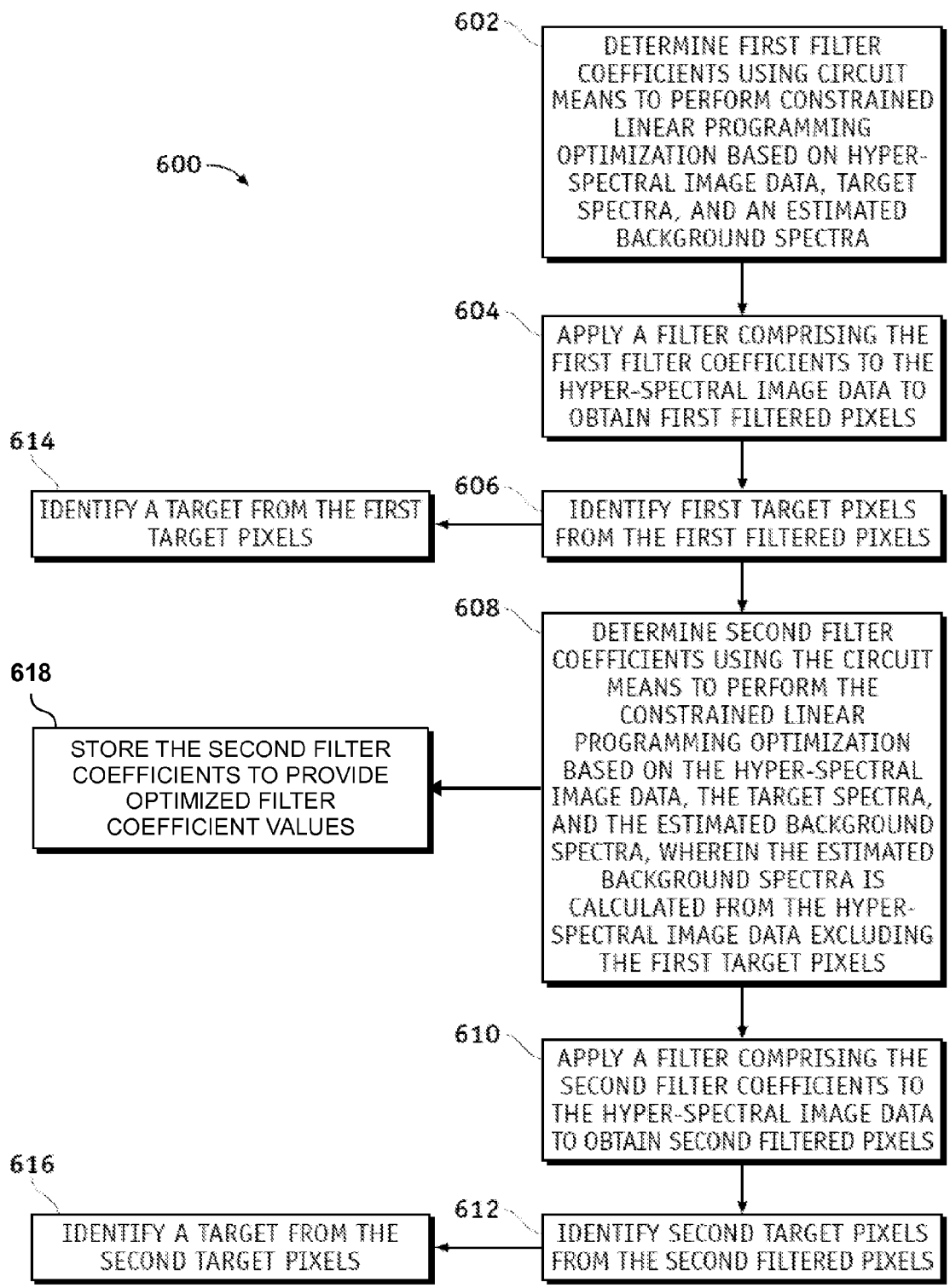
FIG. 6 is an illustration of a flow diagram showing an exemplary process for target detection from hyper-spectral image data according to an embodiment of the disclosure.

FIG. 6 is an illustration of a flow diagram showing an exemplary process 600 for target detection from hyper-spectral image data according to an embodiment of the disclosure. The various tasks performed in connection with the process 600 may be performed by software, hardware, firmware, or any combination thereof. For illustrative purposes, the following description of the process 600 may refer to elements mentioned below in connection with FIG. 7. In practical embodiments, portions of the process 600 may be performed by different elements described below in the context of discussion of circuit 700. Process 600 may have functions, material, and structures that are similar to the embodiments shown in FIGS. 1-5 and 7. Therefore common features, functions, and elements may not be redundantly described here.

Process 600 may begin by determining first filter coefficients using circuit means to perform constrained linear programming optimization such as a modified CEM algorithm based on the hyper-spectra image data $x_i$, the target spectra t, and the estimated background spectra $\bar{x}$ (task 602). The first filter coefficients can be determined by using a circuit configured for constrained linear programming optimization based on the hyper-spectra image data $x_i$, the target spectra t, and the estimated background spectra $\bar{x}$. In this manner, the modified CEM algorithm can be mapped onto the APP 212 that can process linear programming optimization algorithms in real-time or near real-time optimizing a utility function over a convex polytope. As explained in more detail below in the context of FIG. 7, dedicated circuits can be used to execute a substantially real time algorithm based on the modified CEM algorithm discussed in the context of FIG. 3 above. The modified CEM algorithm is formulated as a constrained linear programming optimization problem.

Process 600 may continue by applying a filter comprising the first filter coefficients to the hyper-spectra image data $(x_1, x_2, \ldots, x_9)$ to obtain first filtered pixels (task 604). The modified CEM algorithm can detect target material even when the spectra t of the target material is known and the spectra of other materials are unknown.

Process 600 may continue by identifying first target pixels comprising the target material in their respective hyper-spectra image data $x_i$ from the first filtered pixels (task 606). In this manner, the CEM filter coefficients w are determined by applying the constrained linear programming optimization to determine unknown filter coefficients. Then, the CEM filter coefficients w are applied to the pixel data vectors (e.g., nine pixels $x_1, x_2, \ldots, x_9$ of the real valued matrix X, p=9 rows of $x_i$ and nb=210 columns of $\lambda_i$) to obtain CEM values for the first filtered pixels. A search is made through the CEM values for each of the nine pixels data vectors $(x_1, x_2, \ldots, x_9)$, and CEM values that reach a threshold are identified as first target pixels. However, to increase accuracy, the first target pixels may be removed from calculations of the estimated background spectra $\bar{x}$ to distinguish spectra t of the target material from spectra of unknown background materials $(S_1, S_2, S_3)$.

Process 600 may continue by identifying a target from the first target pixels (task 614). The target 104 and/or other targets can be identified based on the first target pixels.

Process 600 may continue by determining second filter coefficients using circuit means to perform constrained linear programming optimization such as the modified CEM algorithm based on the hyper-spectra image data $x_i$, the target spectra t, and the estimated background spectra $\bar{x}$, where the estimated background spectra $\bar{x}$ is calculated from the hyper-spectra image data $x_i$ excluding hyper-spectra image data $x_i$ for the first target pixels (task 608). Task 608 repeats the task 604 with hyper-spectra image data $x_i$ for the first target pixels removed from the hyper-spectral image data $x_i$ for the estimated background spectra $\bar{x}$ estimation process. By removing the first target pixels that comprise the target material spectra t from the estimated background spectra $\bar{x}$ estimation process, the functional reliability as well as target detection and $y_i$ estimation performance of the modified CEM algorithm is significantly improved.

Process 600 may continue by applying a filter comprising the second filter coefficients to the hyper-spectra image data $x_i$ to obtain second filtered pixels (task 610). The modified CEM algorithm creates a statistical description of the estimated background spectra $\bar{x}$ of a given scene. The modified CEM algorithm then weights its comparison of the estimated background spectra to target spectra t of the first target pixels in such a way as to minimize effects of any estimated background spectra $\bar{x}$ that might be mixed into the hyper-spectral image data $x_i$. Pixels comprising a specified target material such as the target material of the target 104 are found and an amount (CEM value) of the specified target material in each of the pixels is estimated.

Process 600 may continue by identifying second target pixels from the second filtered pixels (task 612). To simplify and improve ability to implement the circuit design onto an APP platform such as the APP 212, it is necessary to be able to operate on smaller groups of about 30 pixels as well as 300 pixels, for example. In an embodiment, pixels that may comprise the target spectra t are quickly identified and removed from the estimated background spectra $\bar{x}$ estimation process so that the estimated background spectra $\bar{x}$ is uncorrupted by the target spectra t. In this manner, a search is made through CEM values for each of the nine pixels $(x_1, x_2, \ldots, x_9)$ of the real valued matrix X (size p=9×nb=210) and CEM values that reach a threshold are identified as the second target pixels.

Process 600 may continue by identifying a target from the second target pixels (task 616). The target 104 and/or other targets are identified based on the first target pixels.

Process 600 may continue by storing the second filter coefficients to provide optimized filter coefficients (task 618).

Process 600 and portions and tasks thereof may be repeated many times with potentially increasing accuracy with each iteration. For example, tasks 608 through 612 may be repeated using the second target pixels in place of the first target pixels and a third set of target pixels identified using the potentially improved background estimation excluding image data for the second target pixels.

Figure 7:
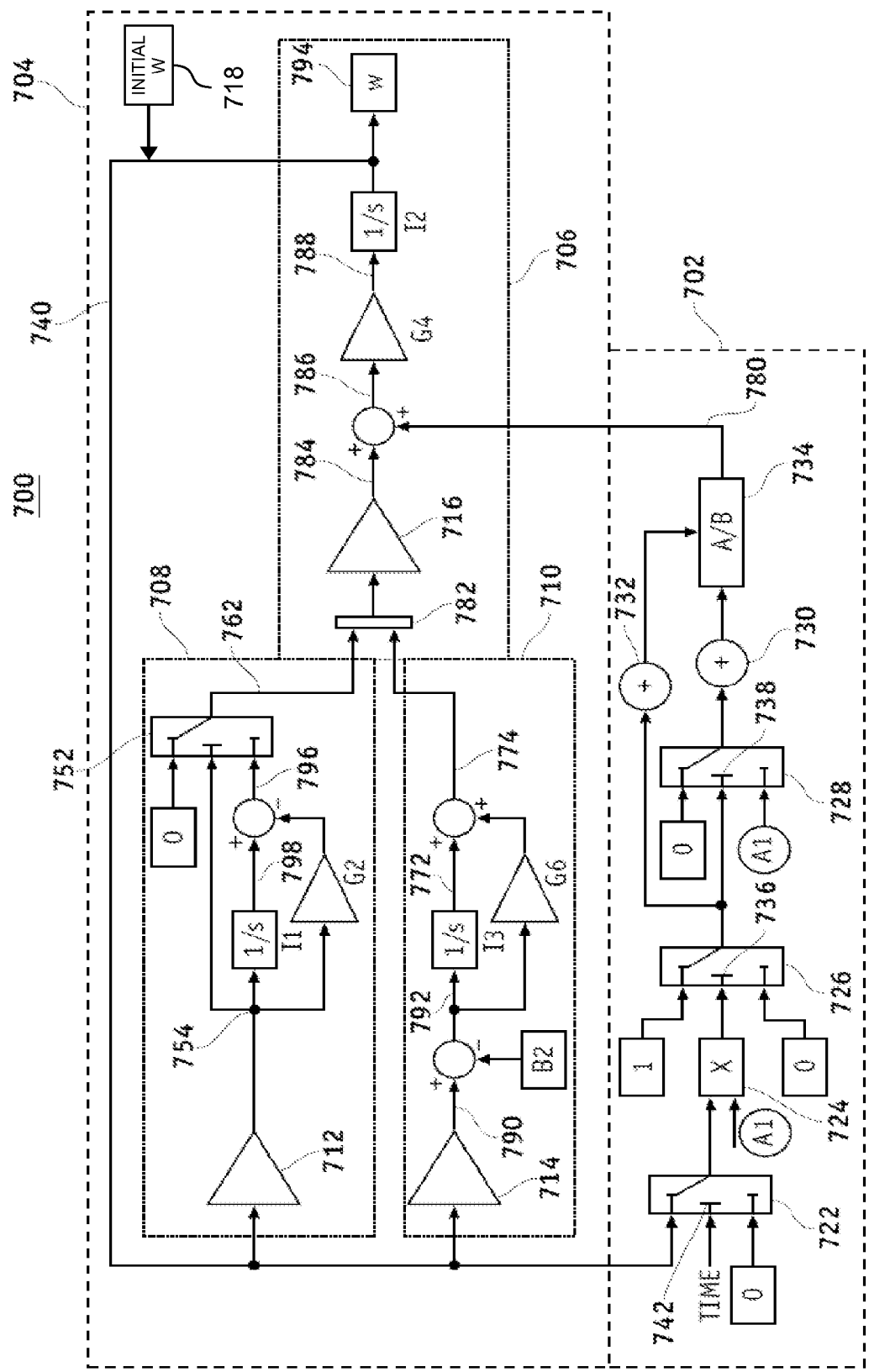
FIG. 7 is an illustration of a circuit implementation of a constrained energy minimization (CEM) algorithm for estimation of background spectra according to an embodiment of the disclosure.

FIG. 7 is an illustration of an exemplary circuit 700 for a modified CEM algorithm for estimation of an estimated background spectra $\bar{x}$ according to an embodiment of the disclosure. As explained above, conventional signal-processing approaches to advanced computationally intensive algorithms such as the CEM algorithm may not be optimal in hardware due to performance limitation of circuits in newer scaled CMOS technologies. Also, traditional digital signal-processing approaches may require high-speed sampling and digitization upfront, and may be limited by high power consumption and low computational speed. In contrast, the APP technology is a continuous-time, discrete-amplitude, asynchronous analog/digital signal-processing technology that can enable simple, high resolution, yet low-power implementation of advanced algorithms, including the ones that require real-time computations or operation. For ease of implementation onto the APP platform such as the APP 212, the modified CEM algorithm is formulated as a linear programming optimization problem in the circuit 700 of the APP 212.

The circuit 700 comprises a control circuit 702 (background spectra estimation module 702), a CEM circuit 704 (CEM circuit 214 in FIG. 2), and an initialization module 718 (initial filter coefficients 718). First, for a given segment of the hyper-spectral image data $x_i$ for a set of pixels, the estimated background spectra $\bar{x}$ is calculated by averaging the spectra $x_i$ of the pixels. The modified CEM algorithm then estimates the CEM filter coefficients w for the given segment of the hyper-spectral image data $x_i$.

The control circuit 702 comprises a first switch 722, a matrix product 724, a second switch 726, a third switch 728, a first summation 730, a second summation 732, and a division 734.

The first switch 722 loads filter coefficient values or zero values depending on a time value 742 on the control circuit 702. Time elapsed serves as a trigger for the first switch 722, if the time elapsed is greater than a pre-defined time threshold, an output of the first switch 722 is a current set of filter coefficient values (size nb×1), else the output of the first switch 722 is a zero vector (size nb×1).

The matrix product 724 comprises a vector of CEM values of the pixels (size p×1) comprising a product of a matrix A1 of the pixels (size p×nb) and the output of the first switch 722 (size nb×1).

The second switch 726 switches between outputting one or zero values depending on the CEM values on the second switch control input 736. The CEM values of the p pixels serve as the trigger for the second switch 726. If the CEM value of each of the p pixels is greater than a pre-defined abundance threshold value, thereby indicating that the pixel might contain the target spectra t, then a zero value is output by the second switch 726 for that pixel. In this manner, exclusion of the pixel comprising the target spectra t from the background spectra estimation process is signaled indicating an estimated background spectra is corrupted by the target spectra t. Otherwise, a unity value is output by the second switch 726.

The third switch 728 outputs zeros or a matrix of p pixel spectra $x=(x_1, x_2, \ldots, x_9)$ (size p×nb) depending on a result from the second switch 726 on the third switch control input 738. The output of the second switch 726 serves as a trigger for the third switch 728, if a value corresponding to a pixel data vector $x_i$ is unity, then that pixel data vector $x_i$ (size 1×nb) is relayed to the output of the third switch 728, otherwise if the pixel is flagged with a zero value, a zero vector (size 1×nb) is relayed to the output of the third switch 728.

The first summation 730 operates such that the values (size p×1) from the second switch 726 are summed to calculate a total number of un-flagged pixels that are not likely to comprise the target material.

The second summation 732 sums data from the third switch 728. The vectors (size p×nb) from the third switch 728 are summed (the pixels that are likely to comprise the target spectra t are replaced by a zero vector). The output vector (size 1×nb) is divided by a number of un-flagged pixels to calculate the un-corrupted background spectra.

The division 734 computes the un-corrupted estimated background spectra by dividing the output vector (size 1×nb) of the second summation 732 by the number of un-flagged pixels from the first summation 730. The un-corrupted estimated background spectra comprise the estimated background spectra (energy) computed as $\bar{x}$ in equation (1) above.

The CEM circuit 704 is operable to perform a feedback loop that calculates the minimum of equation (1). The CEM circuit 704 comprises a filter coefficient calculation circuit 706 (filter coefficient calculation module 706), a pixel—filter coefficient matrix product circuit 708 (pixel-filter coefficient matrix product module 708), and a target—filter coefficient matrix product circuit 710 (target-filter coefficient matrix product module).

The target—filter coefficient matrix product circuit 710 computes equation (2) for the target spectra t (size 1×nb) and an instantaneous constrained energy minimization (CEM) filter coefficients vector 740 (size 1×nb) (instantaneous CEM filter coefficient values 740). The matrix product ($w^T * t$ in equation (1)) of the target spectra (t in equation (1)) and the instantaneous CEM filter coefficients vector 740 (w in equation (1)) is calculated by a multiplier 714 to obtain a CEM value result 790 (size 1×1). A value B2 (size 1×1) equal to about one is subtracted from the CEM value result 790 to obtain a differential CEM value 792 (size 1×1). The value B2 represents a CEM value for spectra of a pixel data vector $x_i$ comprising about 100% target spectra t. The differential CEM value 792 comprises a distance (wT*t−1) from wT*t=1 (equation (1)). An integrator I3 provides a low pass filter function of the differential CEM value 792 to reduce fluctuation in the feedback loop of the circuit 704.

A feedback loop penalty factor G6 is added to the integrator I3 output 772 to obtain the target—filter coefficient matrix product output 774 (size 1×1). The feedback loop penalty factor G6 may comprise a first penalty factor times the differential CEM value 792. The first penalty factor may depend, for example but without limitation, on a type of the hyperspectral image data $x_i$, on a rate of convergence of the instantaneous CEM filter coefficients vector 740, circuit characteristics, and the like. The first penalty factor may be, for example but without limitation, a constant value of about 1e3, a variable value between about 0 to about 1e5, or other similar value.

The pixel—filter coefficient matrix product circuit 708 computes equation (2) for the pixel data vector $x_i$ (size p×nb) and the instantaneous CEM filter coefficients vector 740 (size 1×nb). The matrix product ($w^T * x_i$ in equation (1)) of the pixel data vector $x_i$ and the instantaneous CEM filter coefficients vector 740 (w in equation (1)) is calculated by a multiplier 712 to obtain a CEM value result 754 (size 1×p). An integrator I1 provides a low pass filter function of the CEM value result 754 to reduce fluctuation in the feedback loop of circuit 704.

A feedback loop penalty factor G2 is added to the integrator I1 output 798 to obtain an adjusted integrator output vector 796 (size 1×p). The feedback loop penalty factor G2 may comprise a second penalty factor times the differential CEM value 754. The second penalty factor may depend, for example but without limitation, on a type of the hyper-spectral image data $x_i$, on the rate of convergence of the instantaneous CEM filter coefficients vector 740, circuit characteristics, or other parameter of the circuit 700. The first penalty factor may be, for example but without limitation, a constant value of about 1e3, a variable value between about 0 to about 1e5, and the like.

The CEM value result 754 controls a switch bank 752, which sets a zero value or the adjusted integrator output vector 796 in each item of an output vector 762 (size 1×p) depending on the CEM value result 754 for the corresponding pixel data vector $x_i$. If the CEM value result 754 for the corresponding pixel data vector $x_i$ has a value greater than or equal to zero, the output vector 762 in the $i^{th}$ location is zero. If the CEM value result 754 for the corresponding pixel data vector $x_i$ has a value less than zero, the output vector 762 in the $i^{th}$ location is the $i^{th}$ location of the adjusted integrator output vector 796.

The filter coefficient calculation circuit 706 receives the output vector 762 (size 1×p) of the pixel—filter coefficient matrix product circuit 708 and the target—filter coefficient matrix product output 774 (size 1×1) and calculates instantaneous CEM filter coefficient values 740. The instantaneous CEM filter coefficient values 740 are feedback into the pixel—filter coefficient matrix product circuit 708 and the target—filter coefficient matrix product circuit 710, and the calculation is repeated until it converges to the minimum of equation (1).

The output vector 762 of the pixel—filter coefficient matrix product circuit 708 and the target—filter coefficient matrix product output 774 are concatenated to form a single vector 782 (size 1×p+1). A multiplier 716 multiplies the single vector 782 by a matrix (size p+1×nb) of each of the pixel spectra $x_i$ and the target spectra t to obtain a result vector 784 (size 1×nb). The result vector 784 comprises a vector of the CEM values indicating a content of target material in each of the p pixels and in the target spectra t (i.e., a percentage of target material in the target spectra t should be about 100%, $w^T * t=1$). The result vector 784 is added to the estimated background spectra vector 780 (size 1×nb) to obtain an intermediate vector 786 (size 1×nb). The intermediate vector 786 is inverted by the inverter G4 to produce inverted vector 788 and integrated by the integrator I2 to reduce fluctuations to produce the instantaneous CEM filter coefficient values 740. The filter coefficient register 794 (final filter coefficients 794) holds the final filter coefficients w when the CEM circuit 704 converges.

The feedback loop of the CEM circuit 704 iterates until the output vector 762 converges to an all zero vector. After the CEM circuit 704 converges, the final filter coefficients 794 can be used to identify target pixels of the target spectra t of the target 104 according to equation (2). The CEM circuit 704 outputs pixel locations that exceed a specified threshold for a target material of interest. For example but without limitation, the specified threshold for the target material of interest may be about 0.2. Furthermore, the final filter coefficients 794 may be stored as the optimized filter coefficients (w) 794 (stored optimized filter coefficients 794) for use in the initialization module 718 as initial filter coefficients 718 (initial w 718).

The initialization module 718 is operable to set instantaneous CEM filter coefficient values 740 vector to comprise the stored optimized filter coefficients 794.

Figure 8:
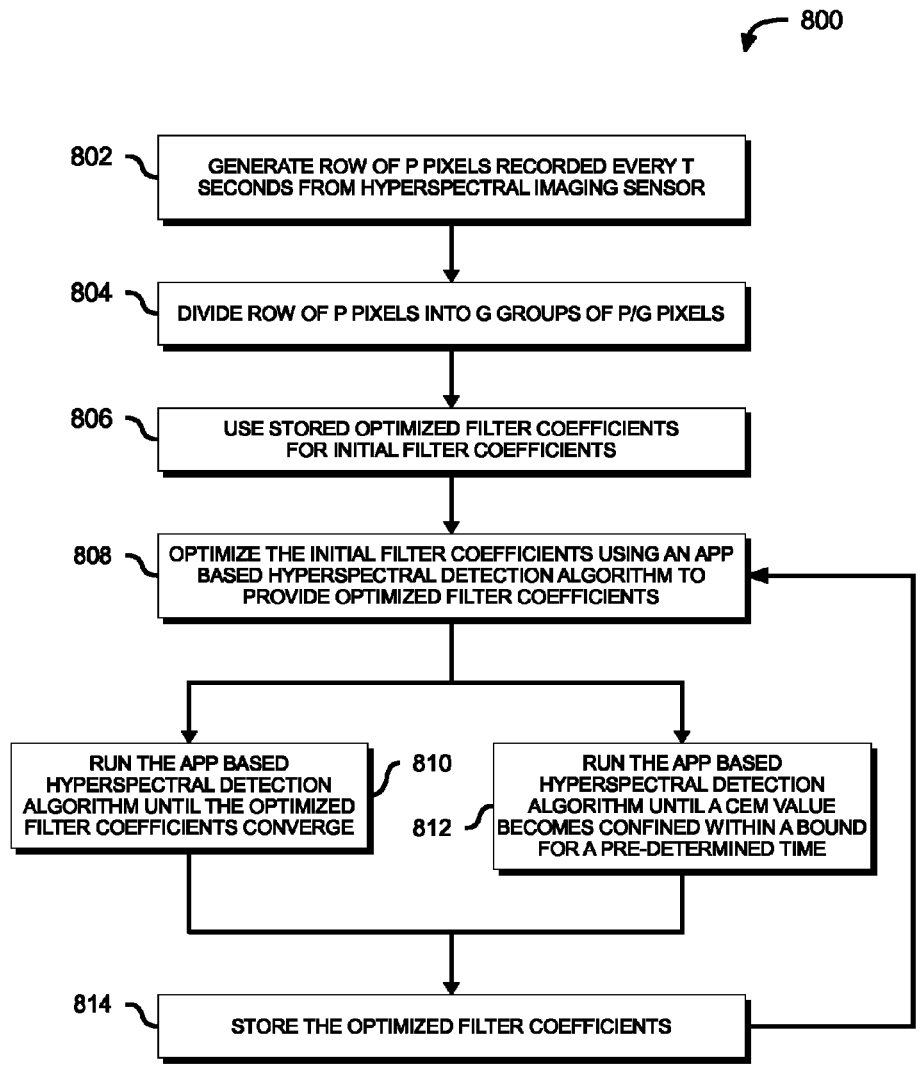
FIG. 8 is an illustration of a flow diagram showing an exemplary process for operation of the circuit of the FIG. 7 according to an embodiment of the disclosure.

FIG. 8 is an illustration of a flow diagram showing an exemplary process for operation of the circuit of the FIG. 7 according to an embodiment of the disclosure. The various tasks performed in connection with the process 800 may be performed by software, hardware, firmware, or any combination thereof. For illustrative purposes, the following description of the process 800 may refer to elements mentioned above in connection with FIG. 7. In practical embodiments, portions of the process 800 may be performed by different elements described below. Process 800 may have functions, material, and structures that are similar to the embodiments shown in FIG. 7. Therefore common features, functions, and elements may not be redundantly described here.

Process 800 may begin by generating a row of P pixels recorded every T seconds (task 802).

Process 800 may continue by dividing the row of P pixels into G groups of P/G pixels such as the pixel data vectors $x_i$ (task 804).

Process 800 may continue by using stored optimized filter coefficients 794 for the initial filter coefficients 718 (task 806).

Process 800 may continue by optimizing the initial filter coefficients 718 using an APP based hyperspectral detection algorithm such as the modified CEM algorithm implemented in the circuit 700 to provide the optimized filter coefficients 794 (task 808).

Process 800 may continue by the circuit 700 running the APP based hyperspectral detection algorithm until the optimized filter coefficients 794 converge (task 810).

Process 800 may continue by the circuit 700 running the APP based hyperspectral detection algorithm until a CEM value such as the CEM value result 754 and the CEM value result 790 becomes confined within a bound for a pre-determined time (task 812).

Process 800 may continue by storing the optimized filter coefficients 794 (task 814).

In this way, a simple, high resolution, yet low-power implementation algorithms for a real-time or near real-time hyperspectral imaging and target detection technique is provided using a continuous-time, discrete-amplitude, analog and digital signal-processing circuit and methods to increase speed of an asynchronous pulse processing based hyperspectral target detection algorithm.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-2 and 7 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A method of increasing speed of an asynchronous pulse processing based hyperspectral target detection algorithm, the method comprising:
   using stored optimized filter coefficients to provide initial filter coefficients;
   optimizing initial filter coefficients using an asynchronous pulse processor based hyperspectral detection algorithm to provide optimized filter coefficients, wherein the asynchronous pulse processor comprises:
      an initialization module configured to set an instantaneous constrained energy minimization (CEM) filter coefficients vector to comprise a plurality of stored optimized filter coefficients;
      a pixel-filter coefficient matrix product module configured to calculate a CEM value vector based on the instantaneous CEM filter coefficients vector; and
      a filter coefficient calculation module configured to provide the instantaneous CEM filter coefficients vector based on the CEM value vector, and store the optimized filter coefficients; and
   storing the optimized filter coefficients.

2. The method according to claim 1, further comprising running the asynchronous pulse processor based hyperspectral detection algorithm until the optimized filter coefficients converge.

3. The method according to claim 1, further comprising running the asynchronous pulse processor based hyperspectral detection algorithm until a constrained energy minimization (CEM) value becomes confined within a bound for a pre-determined time.

4. The method according to claim 1, wherein:
   the asynchronous pulse processor further comprises a background spectra estimation module configured to estimate a background spectra vector; and
   the filter coefficient calculation module is further configured to provide the instantaneous CEM filter coefficients vector based on the background spectra vector.

5. The method according to claim 1, wherein:
   the asynchronous pulse processor further comprises a target-filter coefficient matrix product module configured to calculate a CEM value result; and
   the filter coefficient calculation module is further configured to provide the instantaneous CEM filter coefficients vector based on the CEM value result.

6. The method according to claim 1, wherein the hyperspectral detection algorithm comprises a constrained linear programming optimization.

7. A system for increasing speed of an asynchronous pulse processing based hyperspectral target detection algorithm, the system comprising:
   an asynchronous pulse processor configured to:
      set initial filter coefficients to stored optimized filter coefficients;
      optimize the initial filter coefficients using a hyperspectral detection algorithm to provide optimized filter coefficients; and
      store the optimized filter coefficients, wherein the asynchronous pulse processor comprises:
         an initialization module configured to set an instantaneous constrained energy minimization (CEM) filter coefficients vector to comprise a plurality of stored optimized filter coefficients;
         a pixel-filter coefficient matrix product module configured to calculate a CEM value vector based on the instantaneous CEM filter coefficients vector; and a filter coefficient calculation module configured to provide the instantaneous CEM filter coefficients vector based on the CEM value vector, and store the optimized filter coefficients.

8. The system for target detection from hyper-spectral image data according to claim 7, wherein the hyperspectral detection algorithm comprises a constrained linear programming optimization.

9. The system for target detection from hyper-spectral image data according to claim 7, wherein the asynchronous pulse processor is further configured to run until the optimized filter coefficients converge.

10. The system for target detection from hyper-spectral image data according to claim 7, wherein the asynchronous pulse processor is further configured to run until a constrained energy minimization (CEM) value becomes confined within a bound for a pre-determined time.

11. The system for target detection from hyper-spectral image data according to claim 7, wherein:
the asynchronous pulse processor further comprises a background spectra estimation module configured to estimate a background spectra vector; and
the filter coefficient calculation module is further configured to provide the instantaneous CEM filter coefficients vector based on the background spectra vector.

12. The system for target detection from hyper-spectral image data according to claim 7, wherein:
the asynchronous pulse processor further comprises a target-filter coefficient matrix product module configured to calculate a CEM value result; and
the filter coefficient calculation module is further configured to provide the instantaneous CEM filter coefficients vector based on the CEM value result.

13. A circuit for asynchronous pulse processing based hyper-spectral target detection, the circuit comprising:
an initialization module configured to set an instantaneous constrained energy minimization (CEM) filter coefficients vector to comprise a plurality of stored optimized filter coefficients;
a pixel-filter coefficient matrix product module configured to calculate a CEM value vector based on the instantaneous CEM filter coefficients vector; and
a filter coefficient calculation module configured to provide the instantaneous CEM filter coefficients vector based on the CEM value vector, and store the stored optimized filter coefficients, wherein the circuit is configured to:
set initial filter coefficients to stored optimized filter coefficients;
optimize the initial filter coefficients using a hyperspectral detection algorithm to provide optimized filter coefficients; and
store the optimized filter coefficients.

14. The circuit according to claim 13, wherein the pixel-filter coefficient matrix product module and the filter coefficient calculation module are further configured to run until the optimized filter coefficients converge.

15. The circuit according to claim 13, wherein the pixel-filter coefficient matrix product module and the filter coefficient calculation module are further configured to run until at least one of CEM value of the CEM value vector becomes confined within a bound for a pre-determined time.

16. The circuit according to claim 13, further comprising a background spectra estimation module configured to estimate a background spectra vector, wherein the filter coefficient calculation module is further configured to provide the instantaneous CEM filter coefficients vector based on the background spectra vector.

17. The circuit according to claim 13, further comprising a target-filter coefficient matrix product module configured to calculate a CEM value result, wherein the filter coefficient calculation module is further configured to provide the instantaneous CEM filter coefficients vector based on the CEM value result.

18. The circuit according to claim 13, wherein the circuit is configured to perform a constrained linear programming optimization.

* * * * *